United States Patent
Holich

[11] Patent Number: 6,098,721
[45] Date of Patent: Aug. 8, 2000

[54] TOOL FOR CULTIVATING AND HILLING ROW CROPS

[76] Inventor: Martin W. Holich, 186 N. Hatfield Rd., North Hatfield, Mass. 01330

[21] Appl. No.: 09/370,138

[22] Filed: Aug. 9, 1999

[51] Int. Cl.[7] .................................................. A01B 39/26
[52] U.S. Cl. ............................................. 172/508; 172/771
[58] Field of Search .......................... 172/81, 508, 517, 172/516, 515, 771, 765

[56] References Cited

U.S. PATENT DOCUMENTS

| | | | |
|---|---|---|---|
| 237,057 | 1/1881 | Sherwood | 172/508 X |
| 961,895 | 6/1910 | Price | 172/508 |
| 1,413,641 | 4/1922 | Whipple | 172/508 |
| 2,077,334 | 4/1937 | Lebow | 172/508 X |
| 2,832,382 | 4/1958 | Lahar | 172/508 X |
| 2,849,940 | 9/1958 | Haynes | 172/771 X |
| 2,865,276 | 12/1958 | Reed | 172/771 X |
| 3,063,505 | 11/1962 | Nelson | 172/765 X |
| 3,331,449 | 7/1967 | Blocker | 172/508 X |
| 3,680,648 | 8/1972 | Tonsfeldt | 172/508 X |
| 3,826,315 | 7/1974 | Blair | 172/508 X |
| 4,333,533 | 6/1982 | Zahra et al. | 172/508 X |
| 5,303,780 | 4/1994 | Evenson | 172/508 X |

FOREIGN PATENT DOCUMENTS

| | | | |
|---|---|---|---|
| 1549136 | 12/1968 | France | 172/765 |
| 6-261601 | 9/1994 | Japan | 172/508 |
| 1819119 | 5/1993 | U.S.S.R. | 172/508 |

*Primary Examiner*—Christopher J. Novosad

[57] ABSTRACT

A novel cultivator comprising a scoop and chute blade to scoop up dirt between rows of plants and direct a portion of the dirt onto a hill about the base of the plants to cover weeds without disturbing produce plant roots. A leaf lifter bar is provided to lift produce leaves above the moving dirt.

2 Claims, 5 Drawing Sheets

TOOL FOR CULTIVATING AND HILLING ROW CROPS

BACKGROUND

The present invention is an implement for cultivating row crops and hilling dirt close to the stem of the plants while lifting the plant's lower leaves out of the way of the moving dirt.

The process of removing weeds or of at least hindering their growth to allow production crops an advantage has evolved from hoeing by hand to tractor drawn cultivators working the areas between rows combined with hand hoeing close to plants. Further evolution has replaced the hand hoeing close to plants with herbicide application which is both expensive and a potential danger to the environment. The present invention is tractor driven and duplicates the results of hand hoeing which reduces or eliminates the need for herbicides.

Some previous cultivators have provided fenders or deflectors to break the throw of the earth as it leaves the plow or shovel to keep the dirt from covering and damaging the plants. For examples see U.S. Pat. No. 311,909 awarded Gilbert Miller Feb. 10, 1885 and also U.S. Pat. No. 5,303,780 to Duwayne Evenson Apr. 19, 1994. Both of these devices only bounce the dirt back down to the land and do not provide a horizontal, lateral throw of earth for covering weeds near the plants. For all prior art designs to get dirt close to the plant stems, plowing would need to be so close to the plants that their roots would be disturbed. The present invention lifts the crop's leaves as the implement passes, and dirt is directed laterally toward the stems without leaf or root damage.

SUMMARY OF THE INVENTION

The present invention provides a cultivator plow consisting of a scoop smoothly connected to a hiller chute in combination with a leaf lifter arm. In operation, mirror image units are mounted under a tractor so that as they are advanced each scoop picks up dirt in the row space, the chutes direct the dirt laterally inward toward the stems of the plants while the lifter arms raise the plant's leaves to be above the moving dirt. Dirt is thrown from both sides covering weeds under the plants without damaging the plants' roots or their leaves.

In addition to the above advantages and objects, the present invention:

aids in the production of organic crops,
breaks and loosens the soil to allow it to warm and also reduce water evaporation for better plant growth;
helps distribute any broadcast fertilizer nearer to the plants;
allows rapidly treating large areas;
can treat plants at various growth stages; and
provides a trench away from the plants to hold sitting rain water which limits Blue Mold growth and its harmful effects on production plants.

BRIEF DESCRIPTION OF THE DRAWINGS

FIG. 1 is a pictorial showing the scoop and chute combination.

Figure 4:
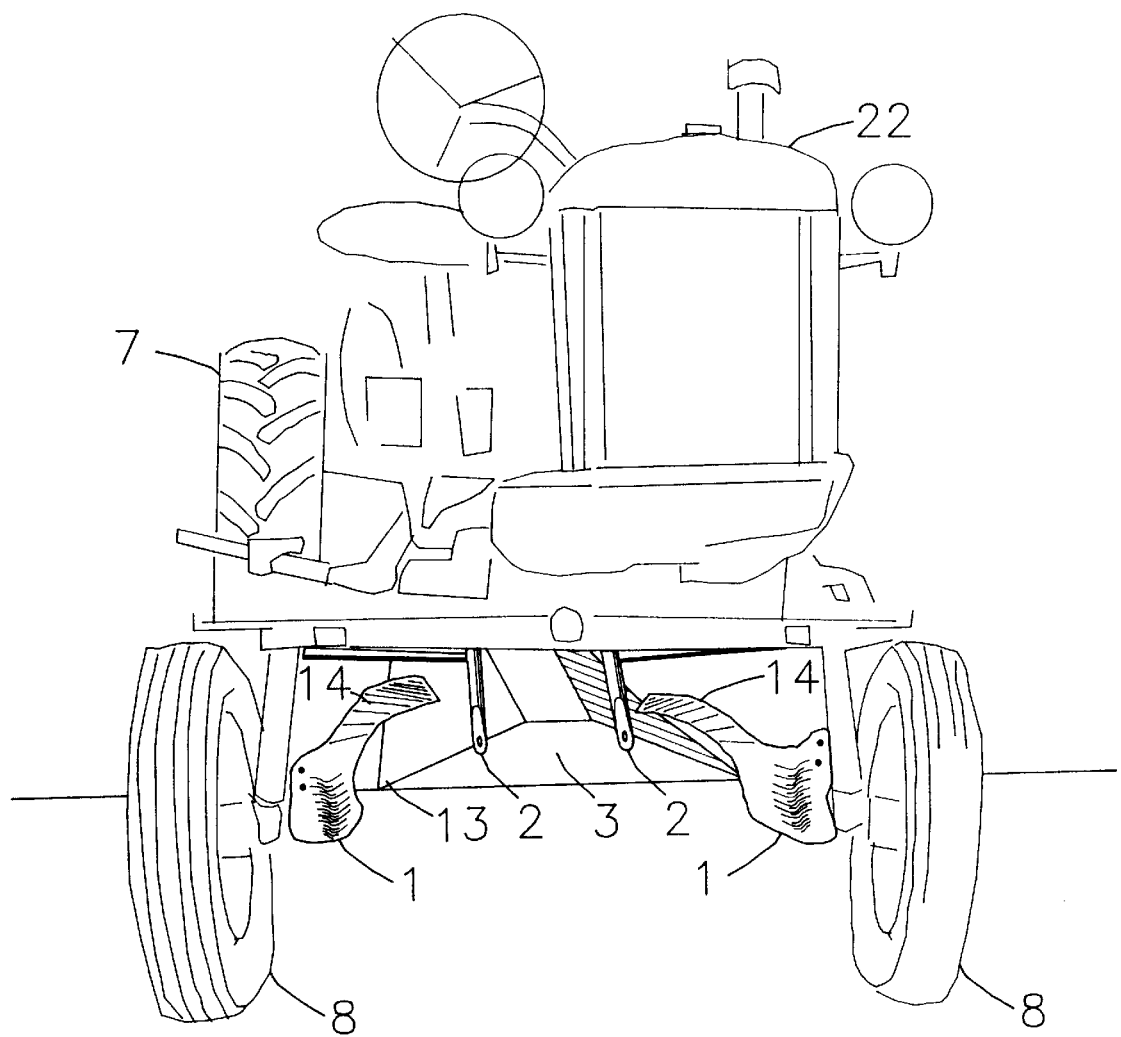
FIG. 4 is a sketch indicating the tractor mounting positions for the parts of the invention.
Figure 5:
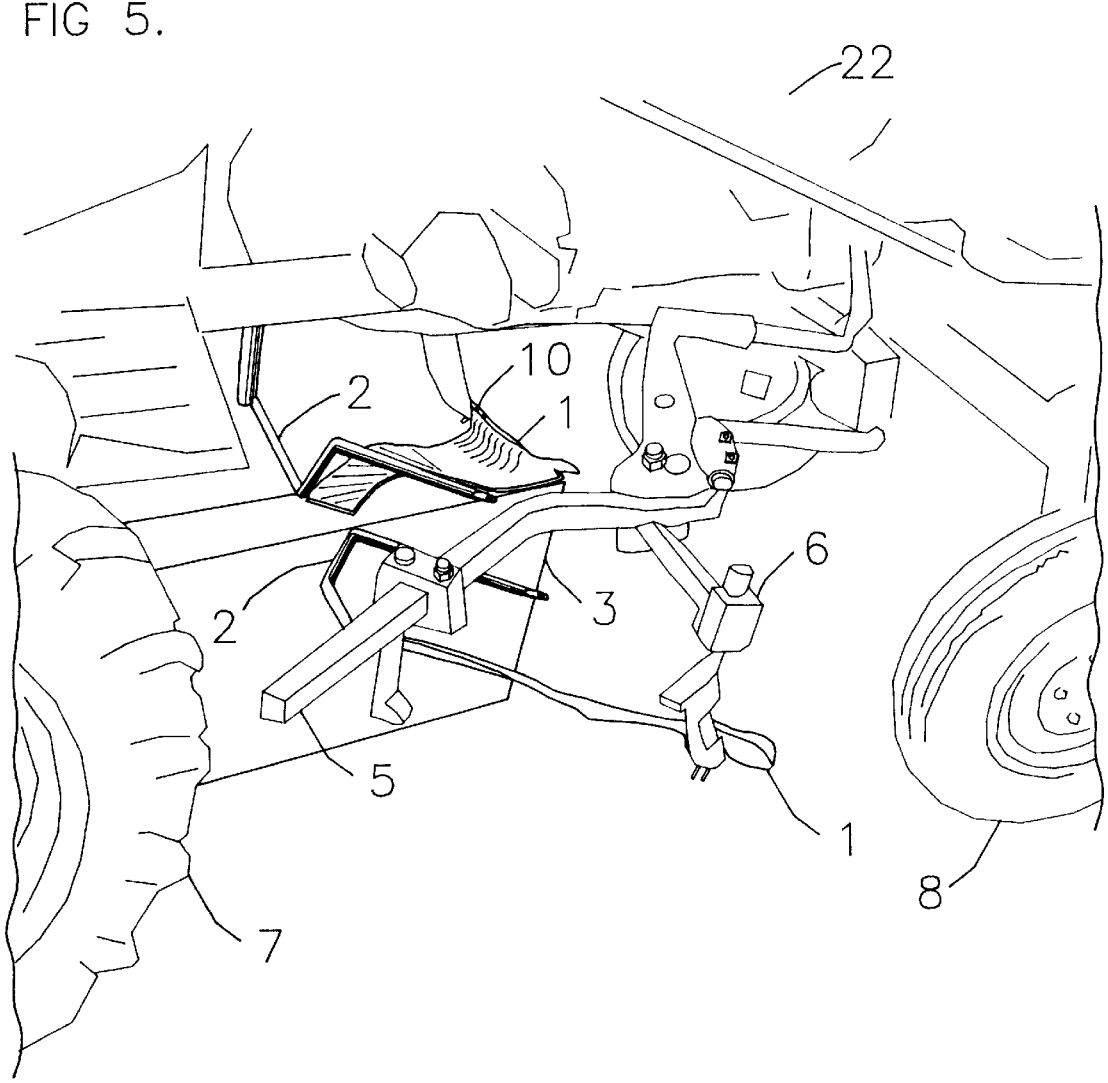
FIG. 5 depicts an exemplar tractor mounting for the invention.

DESCRIPTION OF THE PREFERRED EMBODIMENT:

The preferred embodiment comprises a scoop 1 and chute 14 positioned and connected to a leaf lifter 2. Said scoop 1, chute 14 and leaf lifter 2 are mounted to the underside of a tractor 22 laterally spaced from a mirror construction of the scoop 1, chute 14 and leaf lifter 2. Both sets are rigidly attached at attachment points 10 to a carrier 5 under the tractor frame with appropriate hardware 6 as depicted in FIGS. 4 and 5. While the mounting under the tractor is preferred because the front tractor wheel 8 and rear tractor wheel 7 naturally follow the surface of the soil giving the scoop 1 an even depth, an alternate mounting might be on a towed implement.

The scoop 1 and chute 14 is made of a die cast metal preferably of steel, but other materials such as aluminum work well although wear more rapidly in abrasive soils. A single casting for the scoop 1 and chute 14 is preferred, but multiple pieces matched to form a smooth surface may be effective. The surface of the casting is best if smooth and contoured to move dirt as hereinafter described.

In operation, said tractor 22 propels the invention along a row of plants 4 away from plant roots 20 in the direction indicated by arrow A in FIG. 1 at a rapid pace of 5 to 9 miles an hour. A leading point P and horizontal sharpened leading edge 12 run a few inches below the top of the soil, loosen the dirt and cause the dirt to start rising. At section 1A a smooth contour and transition of the surface from said leading edge 12 channels the dirt in various useful directions. Dirt traveling over the convex area generally indicated as 'B' falls loosely back into the furrow 13, dirt traveling in the concave area generally indicated as 'C' continues up over the continuing concave surface and falls through the top edge valley 11 back to the furrow 13, and dirt in the straightish area generally indicated as 'D' continues into the chute 14 area.

Figure 1A:
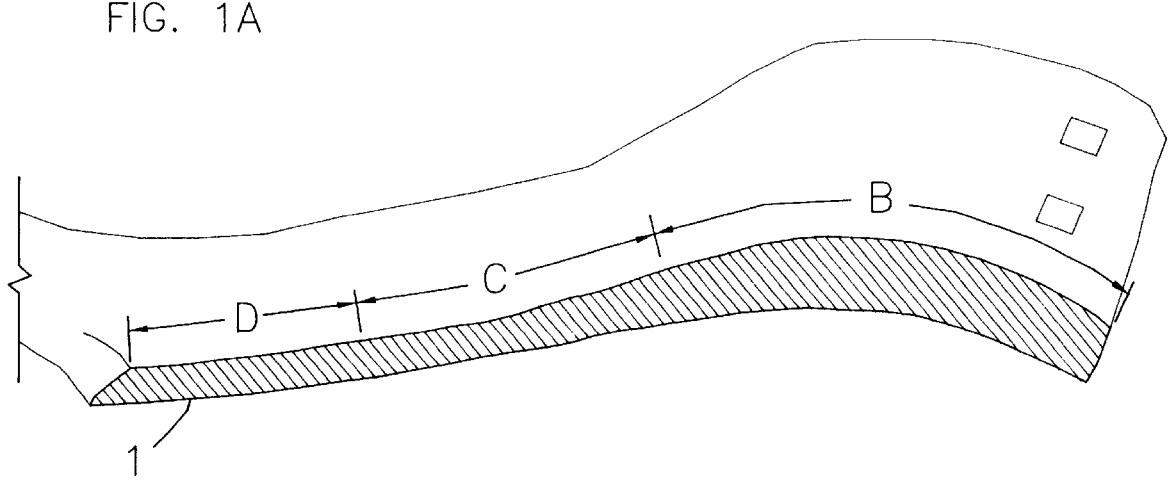
FIG. 1A shows a cross section of the middle of the scoop.
Figure 1B:
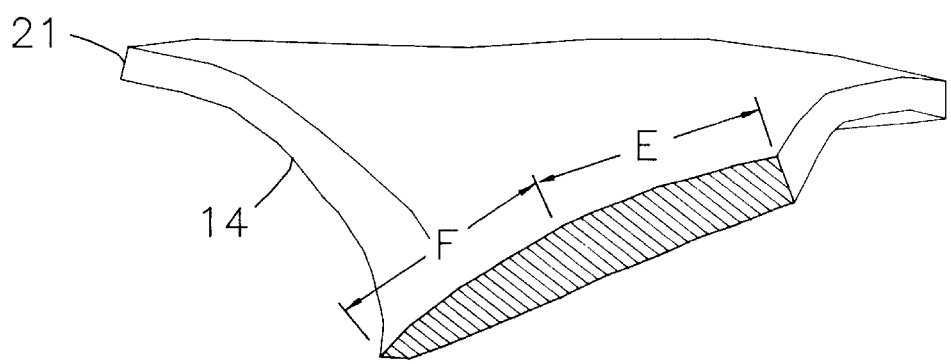
FIG. 1B shows a cross section of the smooth transition from the scoop to the chute.
Figure 1C:
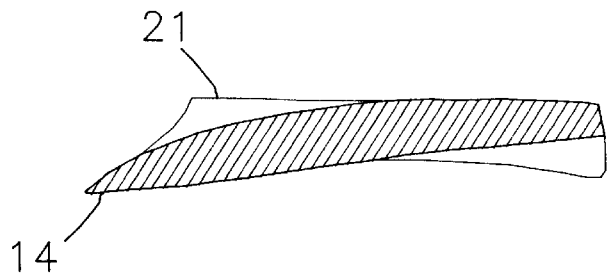
FIG. 1C shows a cross section of the chute.
Figure 2:
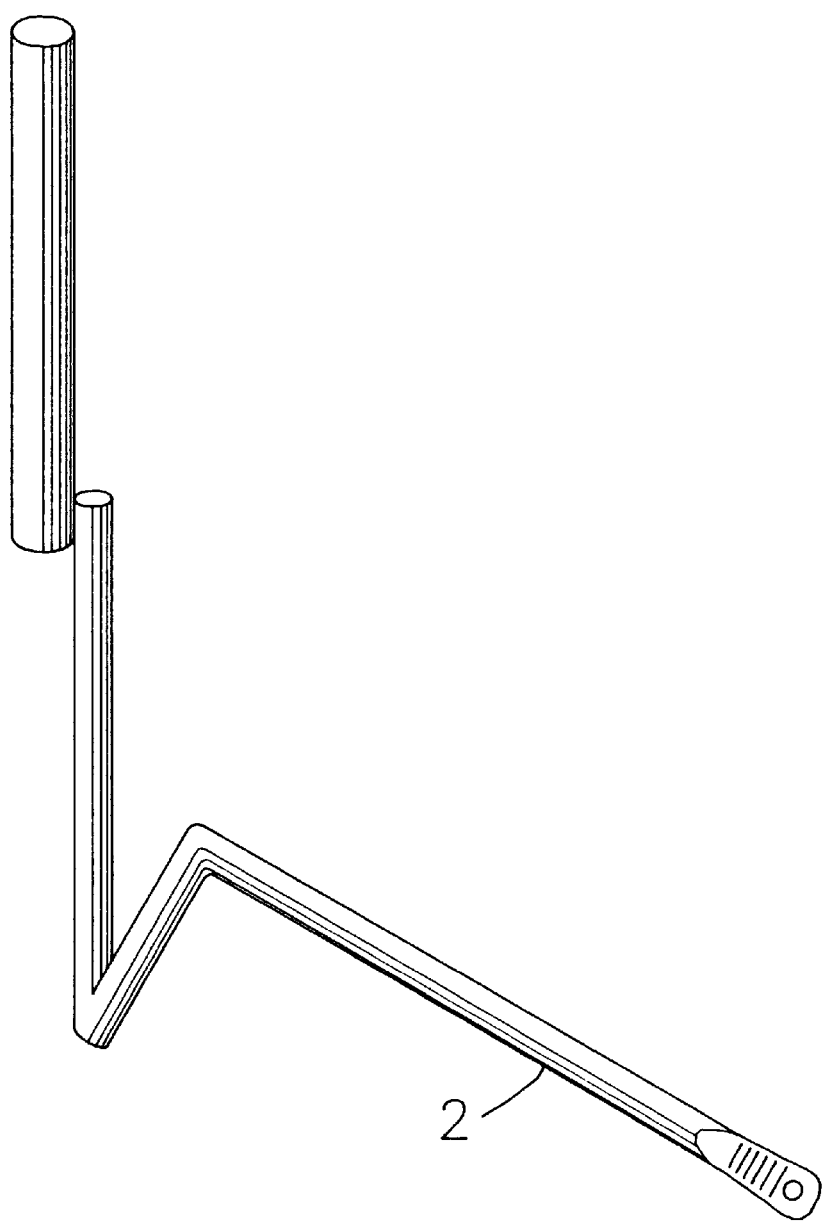
FIG. 2 is a pictorial of a leaf lifter arm.
Figure 3:
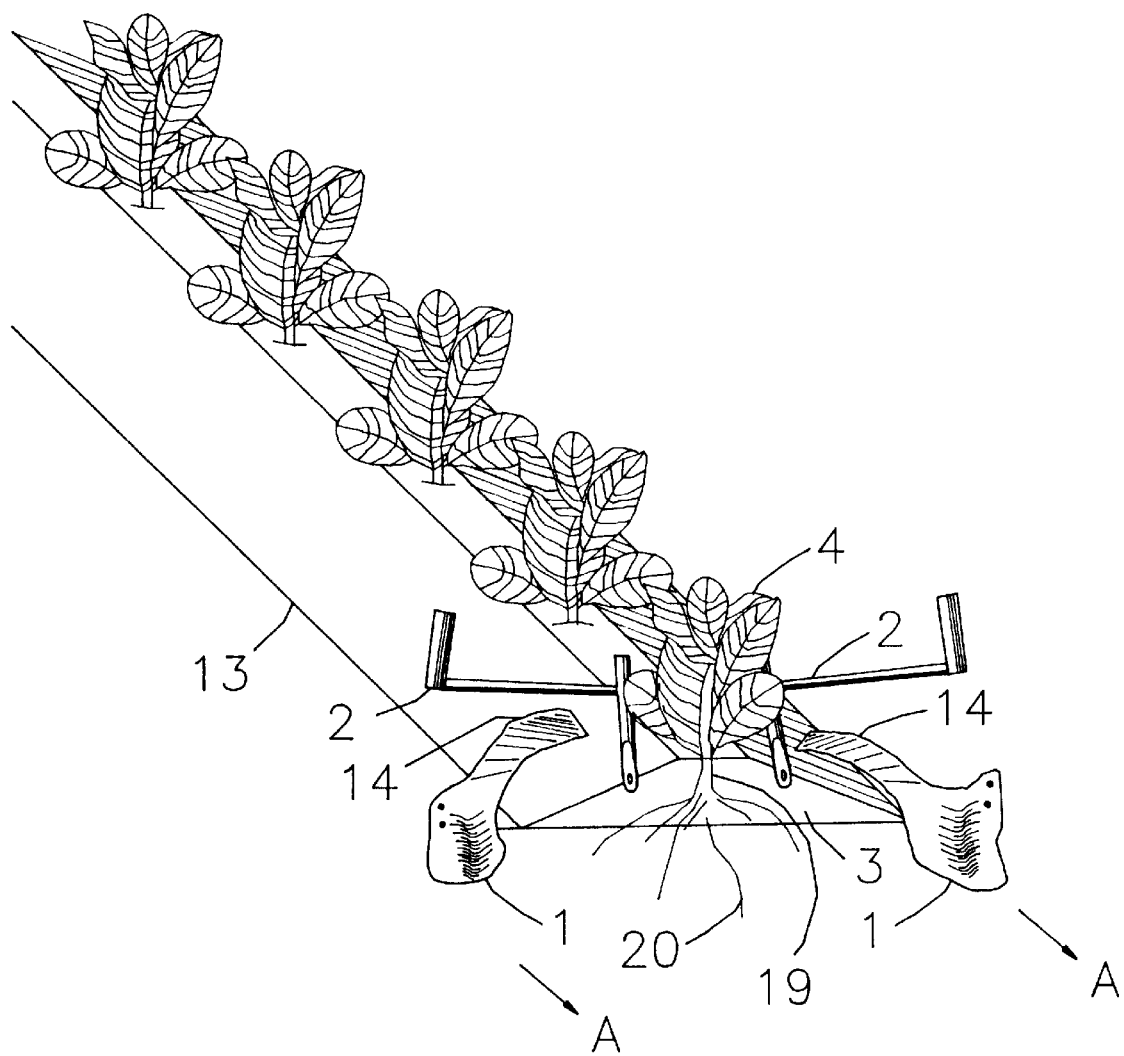
FIG. 3 shows the relative positions of the row of plants and the working invention.

The surface of the scoop 1 and chute 14 transitions smoothly from the scoop surface depicted in FIG. 1A to the start of the chute 14 surface depicted in the section of FIG. 1B. Here the dirt crossing the surface generally indicated as 'E' falls over the top edge loosely onto the side of the hill 3 adding to the height of the hill 3 and covering any emerging weeds. Some of the dirt crossing the surface generally marked as 'F' continues into the 'E' area, but most of this dirt crosses onto the flatter and more horizontal chute 14 as seen in FIG. 1C. Here the dirt spreads out and slows, but still carries enough momentum to be directed and propelled several inches from the end 21 of the chute 14 to the base of the plant 19. Dirt crosses both scoop 1 and its mirror image scoop 1 simultaneously causing a thin layer of dirt to be mounded next the plant base 19 evenly on all sides.

As scoop 1 and chute 14 approaches a row of plants 4, a leaf lifter 2 comprising a round bar bent and positioned to travel at a slight upward angle to the ground and close to the row crop plants, lifts any leaves that may happen to be where dirt could otherwise fall on top of the leaf

What is claimed is:

1. A row crop cultivator for disturbing weeds while loosening surface soil and hilling crop plants comprising:
   a. blade with a scoop part having a point and a horizontal cutting edge fashioned to cut through a surface layer of soil or dirt, loosen the dirt, cause the dirt to start rising and create a longitudinal furrow,
   b. said blade also having a middle part contoured to direct the travel of dirt from said cutting edge across its surface and to direct most of the dirt loosely back into the furrow,
   c. said blade also having a chute part contoured to direct at least some dirt laterally to form a hill of dirt about the bases of said crop plants,
   d. a leaf lifter positioned to lift leaves of said crop plants as said chute part approaches said plants and to urge said leaves above and out of the path of the laterally moving dirt, and
   e. attachment means for connecting said blade and said leaf lifter to tractor means for propelling said blade and said leaf lifter along a row of plants.

2. The use of a row crop cultivator for disturbing weeds while loosening surface soil and forming a hill about the bases of row crop plants wherein said cultivator comprises:
   a. blade with a scoop part having a point and a horizontal cutting edge fashioned to cut through a surface layer of soil or dirt beside a row of plants, loosen the dirt, cause the dirt to start rising and create a furrow,
   b. said blade also having a middle part contoured to direct the travel of dirt from said cutting edge across its surface and to direct most of the dirt loosely and longitudinally back into the furrow,
   c. said blade also having a chute part contoured to direct at least some dirt laterally to form a hill of dirt about the bases of the plants in said row of plants,
   d. a leaf lifter positioned to lift leaves of said plants as said chute part approaches said plants and to urge said leaves above and out of the path of the laterally moving dirt, and
   e. attachment means for connecting said blade and said leaf lifter to tractor means for propelling a combination of said blade and said leaf lifter along a row of plants.

* * * * *